(12) United States Patent
Jones

(10) Patent No.: US 9,057,643 B2
(45) Date of Patent: Jun. 16, 2015

(54) SEISMIC SENSOR WITH FOUR UNIAXIAL MOTION SENSING ELEMENTS HAVING SUBSTANTIALLY THE SAME ANGLE TO THE VERTICAL AND HORIZONTAL DIRECTIONS

(71) Applicant: Schlumberger Technology Corporation, Sugar Land, TX (US)

(72) Inventor: Robert Hughes Jones, Cambridgeshire (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 13/794,608

(22) Filed: Mar. 11, 2013

(65) Prior Publication Data

US 2013/0186203 A1 Jul. 25, 2013

Related U.S. Application Data

(63) Continuation of application No. 11/576,946, filed as application No. PCT/GB2005/004008 on Oct. 19, 2005, now abandoned.

(30) Foreign Application Priority Data

Oct. 20, 2004 (GB) .................................. 0423216.1

(51) Int. Cl.
*G01P 1/02* (2006.01)
*G01V 1/16* (2006.01)
*G01H 17/00* (2006.01)
(52) U.S. Cl.
CPC . *G01H 17/00* (2013.01); *G01V 1/16* (2013.01)

(58) Field of Classification Search
USPC .......... 73/510, 511, 514.01, 493; 367/188, 58
See application file for complete search history.

(56) References Cited

U.S. PATENT DOCUMENTS

| 4,300,220 | A | * | 11/1981 | Goff et al. ..................... 367/188 |
| 4,791,617 | A | | 12/1988 | Seymour |
| 4,839,872 | A | * | 6/1989 | Gragnolati et al. ........... 367/180 |
| 5,435,178 | A | * | 7/1995 | Edwards .................... 73/170.15 |
| 5,563,575 | A | | 10/1996 | Yamamura et al. |
| 6,122,538 | A | | 9/2000 | Sliwa, Jr. et al. |

(Continued)

FOREIGN PATENT DOCUMENTS

GB 2275337 8/1994
WO 02/068996 9/2002

OTHER PUBLICATIONS

E.I. Gal'perin, "The Polarization Method of Seismic Exploration," D. Reidel Publishing Company 1984.

(Continued)

*Primary Examiner* — Helen Kwok
(74) *Attorney, Agent, or Firm* — Daryl R. Wright; Tim Curington

(57) ABSTRACT

A seismic sensing unit includes four uniaxial sensors each capable of detecting a movement component along a respective axis having a respective orientation and arranged such that the angles between any two of said respective orientations of said respective axes are substantially equal, wherein the uniaxial sensors are arranged such that in use the respective axes are at substantially the same angle to the vertical direction and the horizontal direction, and wherein the uniaxial sensors are geophones, accelerometers, seismometers or their combinations.

11 Claims, 1 Drawing Sheet

(56) References Cited

U.S. PATENT DOCUMENTS

| | | | |
|---|---|---|---|
| 6,128,955 A | 10/2000 | Mimura | |
| 6,366,537 B1* | 4/2002 | Sambuelli et al. | 367/178 |
| 6,453,745 B1* | 9/2002 | Jalkanen | 73/514.09 |
| 6,612,398 B1* | 9/2003 | Tokimatsu et al. | 181/122 |
| 6,791,901 B1* | 9/2004 | Robertsson et al. | 367/58 |
| 6,816,434 B2* | 11/2004 | Jones | 367/13 |
| 6,925,413 B2 | 8/2005 | Krieg et al. | |
| 7,254,093 B2* | 8/2007 | Ray et al. | 367/188 |
| 7,289,898 B2 | 10/2007 | Hong et al. | |
| 2002/0011378 A1 | 1/2002 | Bailey | |
| 2013/0163374 A1* | 6/2013 | Herrmann | 367/20 |

OTHER PUBLICATIONS

I.B. Morozov et al, "Transformation of Four-Component Vertical Seismic Profiling Records from Kola Superdeep Borehole, Russia," Computers & Geosciences vol. 23, No. 10, pp. 1039-1049, 1997.

* cited by examiner

SEISMIC SENSOR WITH FOUR UNIAXIAL MOTION SENSING ELEMENTS HAVING SUBSTANTIALLY THE SAME ANGLE TO THE VERTICAL AND HORIZONTAL DIRECTIONS

CROSS-REFERENCE TO RELATED APPLICATIONS

This is a continuation application of co-pending U.S. patent application Ser. No. 11/576,946 to Robert Hughes Jones, filed on Apr. 10, 2007, and entitled "Sensor Configuration," which is hereby incorporated in its entirety for all intents and purposes by this reference.

BACKGROUND

This invention relates to sensing means.

Sensing means, such as vibration or movement sensing means, are commonly used in a variety of applications. For example, such sensing means are used to detect seismic or microseismic events, and may be located either above or below ground. Typically, the sensing means will comprise a number of uniaxial sensors, such as geophones, accelerometers or seismometers, which are capable of sensing components of movement or vibration along one axis only. To determine the full three-dimensional vibration characteristics of an event, it is necessary to use at least three such uniaxial sensors, arranged in a non-parallel configuration so that the components of the vibration in three orthogonal directions can be resolved. For a three sensor configuration for example, in the simplest case the uniaxial sensors can be aligned along the three orthogonal directions, i.e. along the x, y and z axes of a Cartesian system. As mentioned earlier, the sensors to not need to be orthogonal, but merely need to be non-parallel to allow for full three dimensional resolution.

This orthogonal sensor configuration suffers from practical drawbacks however. Uniaxial vibration sensors tend to perform differently depending on their orientation, for example as a result of the effect of gravity. In practice therefore, it is necessary to use one type of sensor aligned vertically (z-axis), and two sensors of a mechanically distinct type which are aligned horizontally (x and y axes). The requirement of using two different sensors types is troublesome as the characteristics of the sensors, e.g. the sensitivity, may vary with each type and thus be difficult to match. In addition, there is more expense involved, and it is more problematic to replace the sensors in the event of a failure.

This problem may be overcome using a different configuration, in which all three uniaxial sensors are arranged at the same angle with respect to the horizontal (Gal'perin, 1984) whilst maintaining orthogonality. The Gal'perin configuration therefore allows a single type of sensor to be used for each of the three sensors.

Recently, it has been proposed to use four sensor configurations. These have several advantages over the three sensor systems, perhaps the most important being the redundancy built into the system, i.e. should one sensor fail, then full three dimensional resolution can still be obtained from the remaining three operative sensors.

A four sensor Gal'perin configuration has been proposed, which comprises the normal three sensor Gal'perin configuration, with an extra vertically arranged sensor (Gal'perin 1984 and Morozov et al 1997). Here, the angle between the sensors is not equi-angular, some of the pairs of sensors are orthogonal and some are not. This configuration obviously suffers from the drawback that a sensor of a different type must be used for the fourth, vertical sensor.

An alternative four sensor configuration that has been proposed is known as a tetrahedral configuration. In this case, the sensors are arranged along the four vectors that join the centre of a regular tetrahedron with each of its four vertices. In this configuration, all of the sensors are equi-angular, having an angle of 109.471.degree. between the axes of any two sensors, while there is no orthogonality. Such an arrangement is described for example in WO 02/068996. This configuration has the advantage that the sensors can be easily checked, as the summed output of the sensors should equal zero if all sensors are functioning correctly. This property arises as a result of the tetrahedral geometry of the sensors. Again however, this arrangement has the disadvantage that different types of sensors may have to be used, depending on each sensor's angle to the vertical.

It is an object of the present invention to provide a four sensor configuration which has the advantages of a tetrahedral configuration, while removing the need for different types of sensor.

SUMMARY

According to a first aspect of the present invention, there is provided a sensing means comprising four uniaxial sensors each capable of detecting a movement component along a respective axis having a respective orientation and arranged such that the angles between any two of said respective orientations of said respective axes are substantially equal, wherein the uniaxial sensors are arranged such that in use the respective axes are at substantially the same angle to the vertical.

According to a second aspect of the present invention, there is provided a vibration sensing means for determining vibration components in three orthogonal directions comprising four uniaxial sensors each capable of detecting a vibration component along a respective axis having a respective orientation and arranged in a configuration such that the angles between any two of said respective orientations of said respective axes are substantially equal, wherein the uniaxial sensors are arranged such that in use the respective axes are at substantially the same angle to the vertical.

Each respective axis may be at substantially 54.74.degree. to the vertical.

The uniaxial sensors may have associated directional vectors orientated along the respective axes, the direction of the vectors determined by the polarities of the respective uniaxial sensors. In this case, the polarities of the uniaxial sensors may be arranged such that the directional vectors of all of the uniaxial sensors have positive components in the vertical direction. Alternatively, the polarities of the uniaxial sensors may be arranged such that the directional vectors of all of the uniaxial sensors have negative components in the vertical direction.

Preferably, the uniaxial sensors are located along a common axis. In this case, the common axis may lie in the vertical direction.

The uniaxial sensors may for example comprise geophones, seismometers or accelerometers.

According to a third aspect of the present invention there is provided such a sensing means for use in a borehole.

BRIEF DESCRIPTION OF DRAWINGS

The invention will now be described, by way of example, with reference to the accompanying drawings, in which:—

In each of the figures, the upper diagram shows a view of the sensor set from above, while the lower diagram shows a view from the side. In the figures, the X-Z plane is parallel to the paper, Z is +ve up, the X-axis extends from left to right and the Y-axis is perpendicular to the plane of the paper.

DETAILED DESCRIPTION

Figure 1:
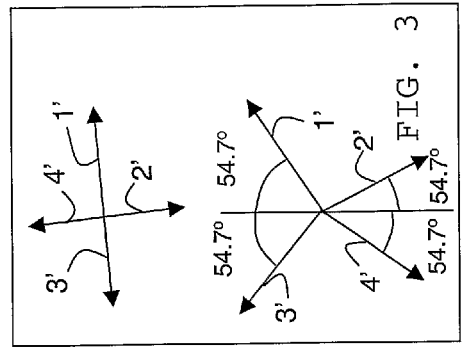
FIG. 1 shows in vector form a known tetrahedral sensor configuration.

FIG. 1 shows a known tetrahedral sensor configuration. Each sensor is denoted by a vector, the arrow-head of the vector denoting the polarity of the sensor. Rotating a sensor by 180.degree. would reverse its output. In addition, the diagram in the lower left corner of FIG. 1 shows that in the figures, a dashed arrow denotes a sensor that has a reverse polarity, i.e. one that has been connected back-to-front. In other words, a normal sensor is equivalent to a reverse polarity sensor rotated through 180.degree. The configuration of FIG. 1 has a vertical sensor 1, with a sub-horizontal sensor 2 in the X=0 plane, and two other sub-horizontal sensors 3, 4. Although difficult to show in the figure, each vector has the same magnitude, and each pair of vectors is at the same angle, about 109.471.degree.

Figure 2:
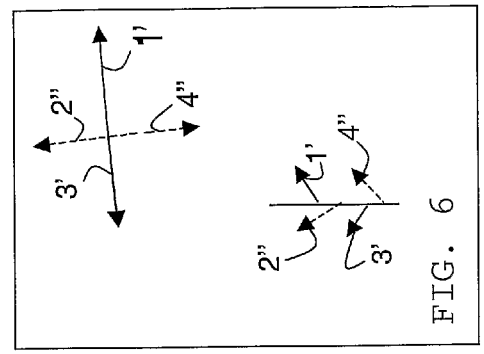
FIG. 2 shows a tetrahedral sensor configuration in accordance with the present invention.

FIG. 2 shows a similar configuration to that of FIG. 1, but here the sensors have been rotated by about 54.7.degree. about the Y-axis. This forms a configuration in accordance with the present invention. Now in plan view it can be seen that the sensors appear to be perpendicular, but this is only by projection. With this arrangement, all of the sensors make substantially the same angle, about 54.7.degree. with the vertical. This is shown more clearly in FIG. 3. Clearly, the sensors also all make the same angle with the horizontal, about 35.3.degree.

Figure 3:
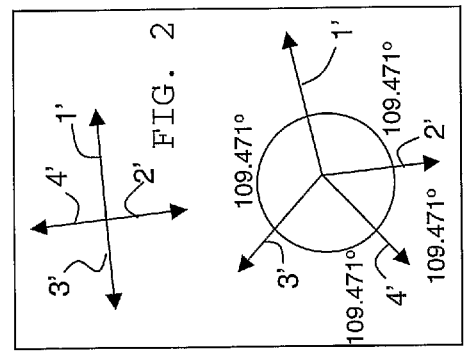
FIG. 3 shows the configuration FIG. 2 in a 2D form.
Figure 4:
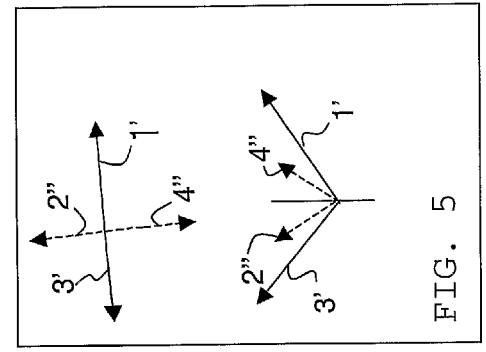
FIG. 4 shows a compacted version of the configuration of FIG. 2.

FIG. 4 shows an equivalent configuration to that of FIGS. 2 and 3, but with a more compact form. This is achieved by sliding the two lower sensors 2', 4' of FIG. 3 up along their own axes. With this configuration, the respective axes of each pair of sensors are still at the same angle of about 109.471.degree., while each respective axis is still at an angle of about 54.7.degree. to the vertical. This configuration has the disadvantage that it may be difficult to physically connect all the sensors.

Figure 5:
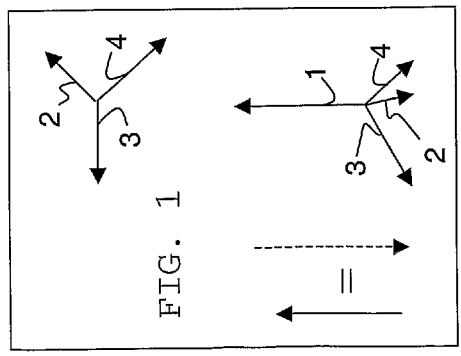
FIG. 5 shows an equivalent configuration to that of FIG. 4.

FIG. 5 shows a modified version of the FIG. 4 configuration in which sensors 2' and 4' have been reversed and had their polarities reversed, as indicated by the dashed arrows 2", 4". All of the sensor vectors now have positive components in the vertical direction. Of course, it would be equally possible to reverse the other sensors 1' and 3' to select a configuration such that all of the sensor vectors would have negative components in the vertical direction, i.e. so that they all point downwards. With these configurations, physical connection is simplified as the sensors now all point outwards.

Figure 6:
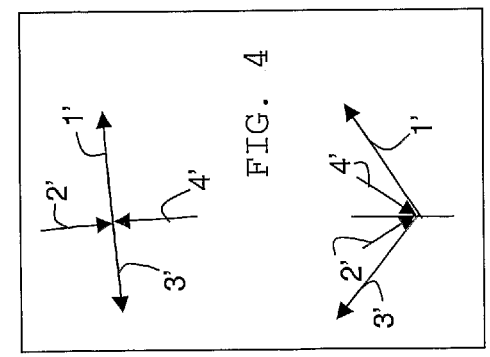
FIG. 6 shows a practical configuration based on that of FIG. 5.

FIG. 6 shows a modified version of the FIG. 5 configuration suitable for some practical applications. Here, the four sensors are moved so that they are located along a common axis, which in this case coincides with the vertical axis, whilst still retaining their original orientations. This means that the orientations of each pair of sensors are still at an angle of about 109.471.degree., while being at an angle of about 54.7.degree. to the vertical. This arrangement is suitable for borehole-deployed applications for example, where the sensors are confined to a relatively narrow longitudinally (i.e. vertically) extending borehole region.

The above-described configurations can be explained more fully by considering the transformations applied to the vectors.

A tetrahedral configuration, such as that shown in FIG. 1, is written using unit vectors as:

|   | X | Y | Z |
|---|---|---|---|
| A | 0 | 0 | 1 |
| B | 0 | 0.942809 | −0.33333 |
| C | 0.816496 | −0.471405 | −0.33333 |
| D | −0.816496 | −0.471405 | −0.33333 | where A, B, C and D are the four sensors and X, Y and Z are the axes of the coordinate system, Z being the vertical component. In this representation, A is vertical and B, C and D are all sub-horizontal. This may be represented by the directional cosine matrix:

$$\begin{pmatrix} 0 & 0 & 1 \\ 0 & 2\sqrt{2}/3 & -1/3 \\ \sqrt{6}/3 & -\sqrt{2}/3 & -1/3 \\ -\sqrt{6}/3 & -\sqrt{2}/3 & -1/3 \end{pmatrix}$$

If we consider A and B to define a plane (the Y-Z or X=0 plane) and rotate the sensors about the origin in this plane by (109.471)/2 degrees we get the following:

|   | X | Y | Z |
|---|---|---|---|
| C | 0 | 0.816497 | 0.57735 |
| D | 0 | −0.816497 | 0.57735 |
| A | 0.816497 | 0 | −0.57735 |
| B | −0.816497 | 0 | −0.57735 |

This can be represented in matrix form as:

$$\begin{pmatrix} 0 & \sqrt{6}/3 & \sqrt{3}/3 \\ 0 & -\sqrt{6}/3 & \sqrt{3}/3 \\ \sqrt{6}/3 & 0 & -\sqrt{3}/3 \\ -\sqrt{6}/3 & 0 & -\sqrt{3}/3 \end{pmatrix}$$

Investigation of this set of unit vectors shows that the angle between all pairs of sensors is still 109.471.degree., which is the requirement for them to be tetrahedrally configured. The Z component of each sensor has a magnitude of 0.57735. In other words, all four sensors form the same angle of 54.7356.degree. to the vertical, and an angle of 35.2643.degree. from the horizontal.

When the polarities of sensors C and D are inverted, and they are reflected through the origin, we can get a set of four sensors all of which point upwards and still form a tetrahedral set. This is:

|   | X | Y | Z |
|---|---|---|---|
| A | 0.816497 | 0 | 0.57735 |
| B | −0.816497 | 0 | 0.57735 |
| C | 0 | −0.816497 | 0.57735 |
| D | 0 | 0.816497 | 0.57735 | where C and D are connected up in the opposite sense to A and B. This gives a convenient configuration for land-based deployments for example.

Another way to imagine the sensor configuration is to picture a cube. The four diagonals that connect the opposite corners of the cube represent the direction cosines of the sensors. The configuration may thus be written as:

|   | X | Y | Z |
|---|---|---|---|
| A | 0.57735 | 0.57735 | 0.57735 |
| B | −0.57735 | 0.57735 | 0.57735 |
| C | 0.57735 | −0.57735 | 0.57735 |
| D | −0.57735 | −0.57735 | 0.57735 | where once again the polarity of two of the sensors is inverted, in this case either A and D or B and C. This way of looking at the configuration emphasises the fact that all the direction cosines have the same magnitude and so it is just a question of changing their signs to give the desired sensor configuration.

The invention could be used for various applications, for example land-based deployments of geophones, accelerometers and seismometers where the orientation with respect to the vertical is typically known and for OBS (ocean-bottom seismometer) node systems. Gimballed OBC (ocean-bottom cable) and borehole systems could also use this sensor geometry.

The orientation also has the advantage for borehole geophones when one connector is at each end of the geophone, e.g. the sm-45 geophone produced by Input-Output Inc. This is because all connectors are easily accessible if the geophones are mounted in this tilted fashion with respect to the axis of the borehole. This is not the case if one sensor is mounted in line with the borehole, which is the conventional way of mounting the sensors.

What is claimed is:

1. A seismic sensor unit comprising:
    four uniaxial sensors, each disposed on different axes and capable of detecting a movement component along a respective axis having a respective orientation and arranged such that an angle between any two of said respective orientations of said respective axes is substantially equal to any other angle between two respective orientations of said respective axes;
    wherein the uniaxial sensors are mounted in the unit such that in use the respective axes are at substantially a same angle to a vertical direction and substantially a same angle to a horizontal direction orthogonal to the vertical direction; and
    wherein the uniaxial sensors are selected from a group consisting of geophones, accelerometers, seismometers, or combinations thereof.

2. A sensor unit according to claim 1, wherein each pair of said respective orientations has an angle of about 109.5°, and each respective axis is at substantially 54.74° and 35.3° to the vertical and horizontal directions respectively.

3. A sensor unit according to claim 1, wherein the uniaxial sensors have associated directional vectors orientated along the respective axes, and the direction of the vectors is determined by the polarities of the respective uniaxial sensors.

4. A sensor unit according to claim 3, wherein the polarities of the uniaxial sensors are arranged such that the directional vectors of all of the uniaxial sensors have positive components in the vertical direction.

5. A sensor unit according to claim 3, wherein the polarities of the uniaxial sensors are arranged such that the directional vectors of all of the uniaxial sensors have negative components in the vertical direction.

6. A sensor unit according to claim 1 for use in a borehole.

7. A vibration sensor unit for determining vibration components in three orthogonal directions comprising:
    four uniaxial sensors each disposed on different axes and capable of detecting a vibration component along a respective axis having a respective orientation and arranged in a configuration such that an angle between any two of said respective orientations of said respective axes is substantially equal to any other angle between two respective orientations of said respective axes;
    wherein the uniaxial sensors are mounted in the vibration sensor unit such that in use the respective axes are at substantially a same angle to a vertical direction and at substantially a same angle to a horizontal direction orthogonal to the vertical direction; and
    wherein the uniaxial sensors are selected from a group consisting of geophones, accelerometers, seismometers, or combinations thereof.

8. A vibration sensor unit according to claim 7, wherein each pair of said respective orientations has an angle of about 109.5°, and each respective axis is at substantially 54.74° and 35.3° to the vertical and horizontal directions respectively.

9. A vibration sensor unit according to claim 8, wherein the uniaxial sensors have associated directional vectors orientated along the respective axes, and the direction of the vectors is determined by the polarities of the respective uniaxial sensors.

10. A sensor unit according to claim 3, wherein the polarities of the uniaxial sensors are arranged such that the directional vectors of two of the uniaxial sensors have negative components in the vertical direction and the directional vectors of the other two of the uniaxial sensors have positive components in the vertical direction.

11. A sensor unit according to claim 3, wherein each uniaxial sensor has two ends, wherein one end is aligned along the same vertical axis but not located at the same vertical location, and the other end is not aligned along the same vertical axis, but distributed about the vertical axis equidistantly.

* * * * *